United States Patent [19]

Rochkind et al.

[11] Patent Number: 5,513,251
[45] Date of Patent: Apr. 30, 1996

[54] METHOD FOR PROVIDING CALL WAITING SERVICE

[75] Inventors: Mark M. Rochkind, Greenwich, Conn.; Lee B. Strahs, Oceanport, N.J.

[73] Assignee: AT&T Corp., Murray Hill, N.J.

[21] Appl. No.: 176,003

[22] Filed: Dec. 30, 1993

[51] Int. Cl.$^6$ .............................. H04M 11/00; H04M 3/42
[52] U.S. Cl. ............................ 379/93; 379/94; 379/215
[58] Field of Search ................................. 379/93, 94, 96, 379/97, 98, 201, 207, 215; 370/76, 58.1, 110.1, 60, 60.1, 62, 110.4; 375/222

[56] References Cited

U.S. PATENT DOCUMENTS

| | | | |
|---|---|---|---|
| 4,512,013 | 4/1985 | Nash et al. | 370/69.1 |
| 4,523,311 | 6/1985 | Lee et al. | 370/69.1 |
| 4,608,686 | 8/1986 | Barsellotti | 370/76 |
| 4,644,527 | 2/1987 | Anderson et al. | 370/58.1 |
| 4,850,011 | 7/1989 | Delmege et al. | 379/201 |
| 4,852,151 | 7/1989 | Dittakavi et al. | 379/93 |
| 4,995,074 | 2/1991 | Goldman et al. | 379/97 |
| 5,410,541 | 4/1995 | Hotto | 370/76 |

*Primary Examiner*—Jason Chan
*Attorney, Agent, or Firm*—Eugene J. Rosenthal

[57] ABSTRACT

The disruption on the data channel caused by use of the conventional call waiting feature with simultaneous voice/data (SVD) modems, when the data channel is active, is overcome by employing SVD modems in the public switched telephone network and supplying the call waiting signal over only one of the channels made available by such an SVD modem. In an exemplary embodiment of the invention, the call waiting signal from the public switched telephone network is supplied by coupling it into the network side of the SVD modems that are provisioned in the public switched telephone network for providing simultaneous voice and data service. Advantageously, a data call that is in progress will not be disturbed by the coupling of an audible signal into the voice channel. Also, since the connection between the user's local SVD modem and the SVD modem in the network to which he is connected can be maintained while changing the source of the data that is coupled to the SVD modem on the network side, it is possible to implement a "data call waiting" feature as well. Moreover, the fact that a voice call is waiting may be signaled over the voice channel or the data channel and, likewise, the fact that a data call is waiting may be signaled over the voice channel or the data channel.

18 Claims, 4 Drawing Sheets

| CUSTOMER NAME | LOGIN | PASS WORD | PHONE NUMBER | BILLING NUMBER | STATE | SVD MODEM POOL | CALL WAITING D | CALL WAITING V | SVD MODEM | ALT MODEM POOL |
|---|---|---|---|---|---|---|---|---|---|---|
| 301 | 303 | 305 | 307 | 309 | 311 | 313 | 317 | 319 | 321 | 323 |
| L. STRAHS | STRA | XYZ1 | 908-555-1234 | 908-555-1234 | VA | 908-555-1000 | N | Y | 1 | |
| B. FREEMAN | FREE | ABC1 | 212-555-2345 | 212-555-2345 | DA | 212-555-1000 | Y | Y | 0 | |
| B. HANSON | HANS1 | RTR1 | 700-555-9283 | 700-555-2395 | NC | 212-555-1000 | N | Y | 1 | |
| E. ROSEN | EJR7 | LTR9 | 700-555-3844 | 700-555-7722 | VD | 212-555-1000 | Y | Y | 14 | 905-555-1000 |
| | | | | | | | | | | |
| M. ROCHKIND | MARK | PO13 | 908-555-8373 | 908-555-8373 | VD | 908-555-1000 | N | N | 5 | |

METHOD FOR PROVIDING CALL WAITING SERVICE

TECHNICAL FIELD

This invention relates to providing simultaneous voice and data communications using simultaneous voice and data modems.

BACKGROUND OF THE INVENTION

People often need to establish voice and data communications with separate destinations at the same time. Prior art methods for obtaining such voice and data communication services include employing (a) Integrated Services Digital Network (ISDN) technology, which is an all digital technology that provides a user with two separate bearer (B) channels, each of which independently and simultaneously carries user information, so that one channel may carry voice while the other channel carries data; b) multiple "plain old telephone service" (POTS) lines; and c) data over voice modems, which carry a full POTS channel and a full data channel on a carrier frequency well above the highest POTS-channel frequency.

ISDN 1) is expensive to implement, 2) is not universally available, and 3) must be provisioned by the local exchange carrier (LEC). Multiple POTS lines are expensive and cumbersome to deal with. Each data over voice modem requires a) a dedicated modem in the central office, b) special conditioning of the local loop to the central office, and c) a limit on the loop length connecting the data over voice modem to the central office. These limitations arise because data over voice modems require additional bandwidth substantially beyond that which is available over a single POTS connection. In addition to the above-noted disadvantages, all the foregoing technologies must be provisioned for use ahead of time, resulting in their being inflexible and lacking portability. As a result, ISDN and data over voice service are not widely available.

Another prior art technology for providing a user with simultaneous voice and data communication service is employed in SVD modems. SVD modems are modems for use in providing simultaneous voice and data service within the bandwidth provided by a single POTS connection, i.e., a bandwidth of approximately 3200 hertz. Present SVD modems typically can provide a telephone quality voice channel and a data channel of up to 4800 bits per second simultaneously. Should the data channel not be in use, the quality of the voice channel is increased slightly. Similarly, if the voice channel is not in use, the speed of the data channel can be increased to 14.4 Kbits per second. (For a detailed description of exemplary technology used in SVD modems see patent application Ser. No. 08/076,505 filed Jun. 14, 1993 and assigned to the same assignee as the present invention.) One exemplary, commercially available SVD modem is the AT&T DataPort® 2001 modem. It is anticipated that future SVD modems will be more efficient, permitting an even higher rate of data transmission while the voice channel is in use.

Because SVD modems communicate over a single POTS channel, they can be attached to the large number of POTS subscriber telephone lines without any advanced provisioning. However, at present, SVD modems can only be used to provide point-to-point simultaneous voice and data service where the parties at each end of the POTS connection have an SVD modem, thereby limiting their usefulness.

In concurrently filed application Ser. No. 08/176,002 it is recognized that an improvement in providing simultaneous voice and data communications can be achieved by provisioning within the public switched telephone network one or more SVD modems that (a) can communicate with SVD modems of the network users over a single "plain old telephone service" (POTS) connection, and (b) can separate, and deliver to different destinations the voice and data channels received from an SVD modem. In order to deliver the received voice and data channels to different destinations, the voice and data channels may be routed separately and independently through the public switched telephone network. The SVD modems in the public switched telephone network can also combine voice and data traffic from separate sources for transmission together over a single POTS connection to a user's SVD modem.

In one exemplary system, an inter-exchange carrier (IXC), e.g., AT&T, provides a plurality of SVD modems arranged as a "modem pool". Callers may access the SVD modems of the pool, which constitutes a shared network resource, to obtain simultaneous voice and data service. To access the SVD modems of the pool, special dialing codes and an optional login procedure are employed. The voice and data channels of an SVD call from a caller are separated at the network side of the SVD modem pool, so that they may be routed to different destinations. After separation, the voice channel of the call is routed over the IXC's circuit switched network and the data channel of the call is carded over a packet network. The voice channel of the call (a) may be routed in the usual manner, e.g., (1) through a LEC, to a voiceband device, such as a telephone, answering machine, facsimile (fax) machine, or conventional modem, or (2) to a network based voiceband audio service; or (b) it may be routed to an SVD modem pool for possible combination with a data channel for delivery to an end-point subscriber who has an SVD modem. The data channel of the call may be routed over the packet network to (a) a host directly connected to the packet network, (b) a modem pool having conventional data only modems, or (c) an SVD modem pool for possible combination with a voice channel for delivery to the end-point subscriber who has an SVD modem.

A user whose SVD modem is connected to an SVD modem in the public switched network and who is not using both the voice and data channels provided by the SVD modem, may originate or receive calls on the unused channel.

SUMMARY OF THE INVENTION

We have recognized that a connection using SVD modems when the data channel is active is incompatible with the conventional call waiting feature. This incompatibility is a side effect of the fact that in the conventional call waiting feature, the call waiting signal, i.e., the signal supplied from the public switched telephone network for notifying a party that another call has arrived on a channel that is already in use and is waiting to be answered, occupies the entire POTS channel from the network to the called party. Since the entire POTS channel is occupied by the call waiting signal, the entire POTS channel is interrupted when the call waiting signal is supplied. Unfortunately, this causes the SVD modem data channel included within the POTS channel to be interrupted, resulting in data loss and, often, disconnection of the data channel.

To overcome this problem, applicants have recognized that, in accordance with the principles of the invention, the call waiting signal must be supplied over only one of the channels made available by an SVD modem. In an exemplary embodiment of the invention, the call waiting signal from the public switched telephone network is supplied by coupling it into the network side of SVD modems that are provisioned in the public switched telephone network for providing simultaneous voice and data service. Advantageously, a data call that is in progress will not be disturbed by the coupling of an audible signal into the voice channel.

Also, we recognize that, since the connection between the user's local SVD modem and the SVD modem in the network to which he is connected can be maintained while changing the source of the data that is coupled to the SVD modem on the network side, it is possible to implement a "data call waiting" feature as well. Moreover, the fact that a voice call is waiting may be signaled over the voice channel or the data channel and, likewise, the fact that a data call is waiting may be signaled over the voice channel or the data channel. Furthermore, a call carried on one of the channels can be placed on hold and a second call, over the same channel, can be placed to a different destination. The signaling for establishing such a second call, as well as for switching between the first and second calls, may be performed over either of the SVD modem channels.

DETAILED DESCRIPTION

Figure 1:
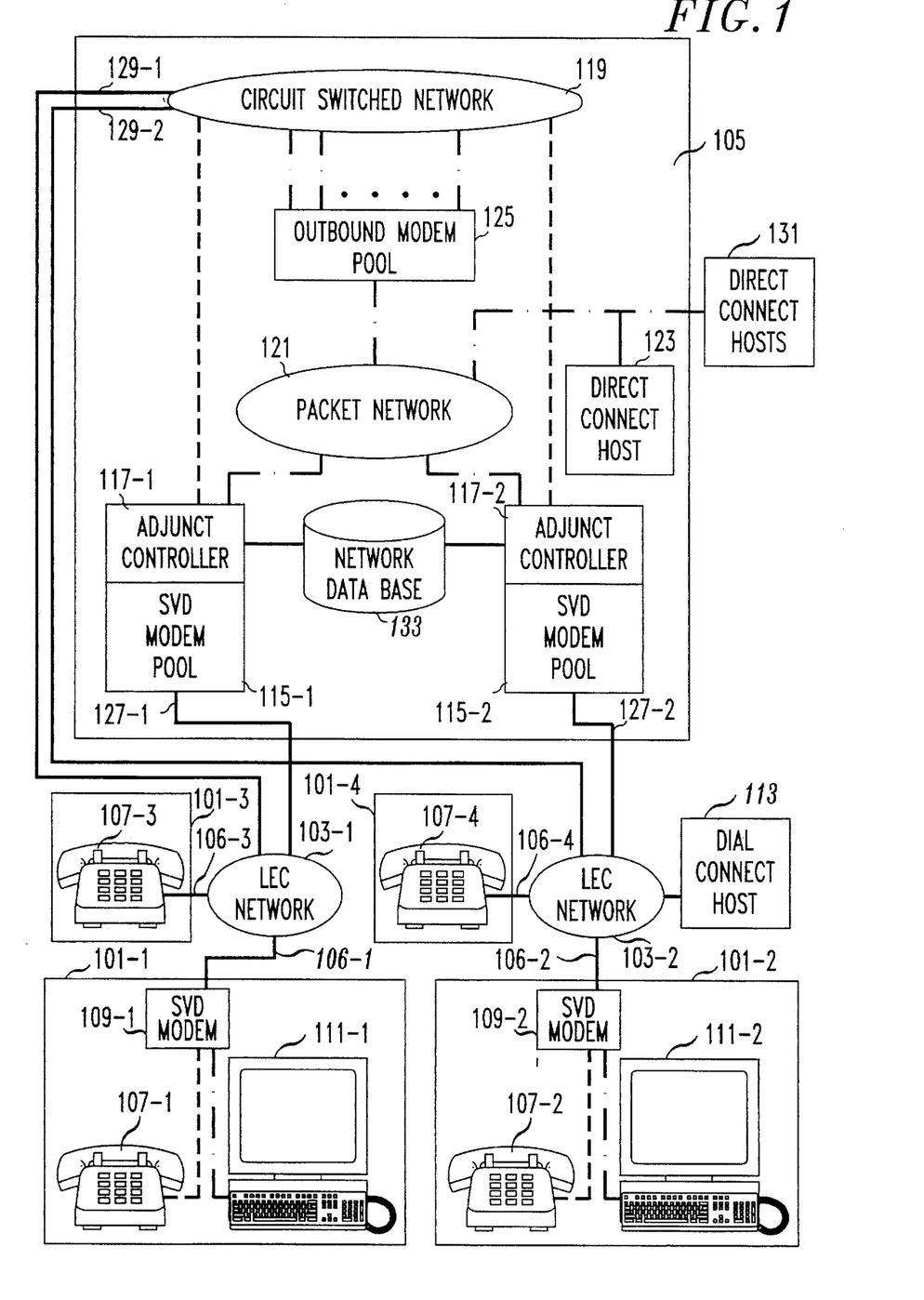
FIG. 1 shows the provisioning of SVD modems within the public switched telephone network for communicating with SVD modems of various subscribers.

In order to understand the invention, it is necessary to generally understand the provisioning and use of SVD modems in the public switched telephone network. To this end, FIG. 1 shows the provisioning of SVD modems within the public switched telephone network for communicating with SVD modems of various subscribers so that a) the voice and data channels output by the subscribers' SVD modems can be separated and separately routed and b) voice and data channels being transmitted to the subscribers' SVD modems can be combined from separate sources. The following key is used to help clarify the various types of communication links shown in FIGS. 1 and 2: a) a dashed line represents a link capable of carrying a voice only connection, b) a dashed-dot line represents a link capable of carrying a data only connection, and c) a solid line represents a link capable of carrying a full POTS channel. Control lines are also shown as solid lines.

FIG. 1 shows subscribers 101, designated 101-1 through 101-4; LEC networks 103, designated 103-1 and 103-2; and IXC network 105. Subscriber 101-1 has 1) a voiceband audio communications device, e.g., telephone 107-1, 2) a data communications device, e.g., terminal 111-1, and 3) SVD modem 109-1, connected to both telephone 107-1 and terminal 111-1. SVD modem 109-1 is also connected to LEC network 103-1 via POTS subscriber line 106-1, i.e., a standard analog local loop. Similarly, subscriber 101-2 has a) a voiceband communications device, e.g., telephone 107-2, b) a data communications device, e.g., terminal 111-2, and c) SVD modem 109-2, connected to both telephone 107-2 and terminal 111-2. SVD modem 109-2 is also connected to LEC network 103-2 via POTS subscriber line 106-2. Subscribers 101-3 and 101-4 each have only a single voiceband communications device, e.g., telephones 107-3 and 107-4, respectively. They are connected to LEC networks 103-1 and 103-2, respectively, by POTS subscriber line 106-3 and 106-4. Also connected to LEC network 103-2 is dial connected host 113, the function of which will be explained further below.

LEC networks 103 are connected to IXC network 105 by a) links 127, which directly connect LEC networks 103 to one of SVD modem pools 115, and b) links 129, which connect LEC networks 103 to circuit switched network 119.

In one implementation, in order to connect either a voice call or a data call via an SVD modem 109 a two-stage dialing procedure is necessary. In the first stage, the telephone number of a first SVD modem pool, e.g., SVD modem pool 115-1, is dialed by the caller, e.g., the subscriber. Such dialing is conventional telephone dialing. This causes a connection to be established from SVD modem 109-1 through LEC 103-1 to an SVD modem in SVD modem pool 115-1. LEC 103 knows that it is routing the call directly to SVD modem pool 115-1 based on the telephone number supplied in the first stage. Alternatively, a connection may be established to SVD modem pool 115-1 via link 129 through circuit switched network 119. Such a connection would be necessary if LEC network 103-1 could not directly reach SVD modem pool 115-1.

Thereafter, in the second stage, a destination indicator, e.g., a telephone number or data address, is supplied for each channel, voice or data, that is to be connected. It is noted that SVD modem 109-1 could be arranged so as to automatically dial the number of the SVD modem pool for the first stage—which is only required if no voice or data call is already in progress through the SVD modem—upon being supplied with the second stage destination indicator.

The destination indicator supplied during the second stage of dialing is forwarded to adjunct controller 117-1. Adjunct controllers 117 and network data base 133 to which they are connected, are described further below. In this example, adjunct controller 117-1 employs a destination indicator received via the SVD modem voice channel as the destination for routing the voice channel. Similarly, in this example, adjunct controller 117-1 employs a destination indicator received via the SVD modem data channel as the destination for routing the data channel.

For voice calls over the voice channel of an SVD modem, adjunct controller 117-1 a) routes the voice channel to circuit switched network 119 and b) supplies all the necessary signaling information so that circuit switched network 119 can further route the voice channel through IXC network 105 on its way to the destination supplied in the second stage of dialing. The routing of the voice channel through IXC network 105 is performed the same as for any ordinary voiceband telephone call. This is because the voice channel is placed into an ordinary POTS channel.

For data calls over the data channel of an SVD modem, adjunct controller 117-1 routes the data channel to packet network 121 and supplies all the necessary information so that packet network 121 can further route the data channel on its way to a destination supplied in the second stage of dialing. In particular, packet network 121 conveys packets containing the information of the data channel across its virtual circuits to the proper one of a) outbound modem pool 125, b) direct connect host 123 or 131, c) or an SVD modem pool 115. Outbound modem pool 125 contains several conventional data only modems, which allow a data channel to be connected to any device having a modem using a matching protocol, e.g., dial connect host 113. Direct connect host 123 is a computer system, having a direct packet network interface, for providing various services to a network subscriber from within the network of IXC 105. Similarly, direct connect host 131 is a computer system, having a direct packet network interface, for providing various services to network subscribers. However, direct connect host 131 is external to IXC network 105. For receiving calls, SVD modem pools 115 combine a received data channel with a voice channel, if any, and transmit the resulting combined signal to a called subscriber, e.g., through one of LEC networks 103.

In order to maximize the use of one's SVD modem, it is best that all incoming calls, whether originated from an SVD modem or not, be processed through an SVD modem pool 115. This is so that the called party may use the channel of his SVD modem that is not required for receipt of the incoming call. For example, a boss calls his telecommuting worker at home to request a particular piece of information that is stored in a data base remote from the worker's home. The worker has an SVD modem attached to his telephone line at home. If the boss' voice call is routed via an SVD modem pool 115, the call will only occupy the voice channel supplied by the employee's SVD modem. Thus, the data channel will remain free so that the employee may place a data call and connect to the remote data base to retrieve the necessary information while he continues to converse with his boss. However, if the boss' call had been routed directly to the employee and not through a modem pool 115, the call would occupy the entire POTS channel to the employee. As a result, the SVD modem would not be able to operate in a simultaneous voice/data mode and the employee would be unable to make the data call necessary to retrieve the information while continuing to talk to the boss. Instead, he would have to end the call with his boss, place a call to the remote data base and retrieve the information sought, then call his boss back to deliver the information.

Therefore, in an exemplary implementation, in order to process all calls to a called subscriber through an SVD modem pool 115 so as to maximize the use of the called subscriber's SVD modem, it is required that a two-stage address be supplied as the destination address for the called subscriber. The first stage address is that of the SVD modem pool 115 to which the called subscriber connects when he makes outgoing calls. The second stage address is an identifier that particularly identifies the called subscriber, e.g., his telephone line.

When a call arrives at one of SVD modem pools 115 from circuit switched network 119 or packet network 121, the particular modem pool having been determined by the first stage address supplied, the associated adjunct controller 117 receives the second stage address and determines whether or not a call using an SVD modem of its associated modem pool is already in progress with the called subscriber. If there is no call through an associated SVD modem already in progress with the called subscriber, adjunct controller 117 assigns the incoming call to an available SVD modem in its associated SVD modem pool 115. It also stores an indication as to which SVD modem the call is assigned. Controller 117 also supplies to the SVD modem the telephone number necessary to dial through LEC network 103 to reach the called subscriber.

If there already is a call in progress with the called subscriber through an SVD modem and the channel for carrying the incoming information is not in use, e.g., the incoming call is on the voice channel and only the subscriber's data channel is in use, or vice-versa, adjunct controller 117 assigns the incoming channel to the SVD modem in SVD modem pool 115 that is already assigned to the called subscriber. The information in the arriving channel is combined by the SVD modem with that of the channel already in use and the combined signal is supplied to the called subscriber through LEC network 103 over the already existing connection.

In another implementation, to maximize the availability of simultaneous voice and data service to a called subscriber, each SVD modem user is assigned a special translatable number, e.g., a 700 number. By virtue of the translation function, all calls placed to a subscriber's 700 number are automatically routed to a predetermined SVD modem pool 115. In addition, the translation function is augmented—which those skilled in the art know how to do—to provide an additional indicator of the telephone number of the line by which the subscriber's SVD modem is connected to network 103. When the call arrives at SVD modem pool 115 specified by the translation, adjunct controller 117 receives the additional indicator corresponding to the telephone number of the called subscriber's telephone line. The call is then connected, based on whether or not one of the channels is already in use, as described above. In the basic scenario, if the particular channel over which the call must be carried is in use, a busy indication is returned to the caller.

In yet another implementation, it is possible to dial the called subscriber's number directly and have the call automatically routed to SVD modem pool 115 when the called subscriber is already using one of the SVD channels. This is done by using the well-known overflow (transfer) on busy. Since the subscriber is already using one of the channels supplied by the SVD modem, his telephone line appears to LEC network 103 to be busy. In such a situation, a call placed directly to the subscriber's telephone line would ordinarily be blocked by LEC network 103 because the called subscriber is busy. However, if a) the subscriber has subscribed to overflow on busy and b) he has supplied the number of SVD modem pool 115 as the forwarding number, the incoming call will automatically be forwarded to SVD modem pool 115. The LEC supplies to adjunct controller 117 the originally dialed number as part of the overflow on busy feature. Adjunct controller 117 then determines the telephone line to which the call was originally placed and causes the incoming call to be connected to the SVD modem already in use by the called subscriber. The SVD modem then combines the incoming channel with the channel that was already in use by the called subscriber, provided that the presently incoming channel and the already in use channel are not the same type, i.e., not both data or not both voice. If the presently incoming channel and the already in use channel are the same, a busy indication is returned to the calling party.

It is also possible to reprogram the switches of the public switched telephone network so that all calls to the telephone numbers of particular users are routed through an adjunct controller 117 and modem pool 115 prior to being completed.

Figure 2:
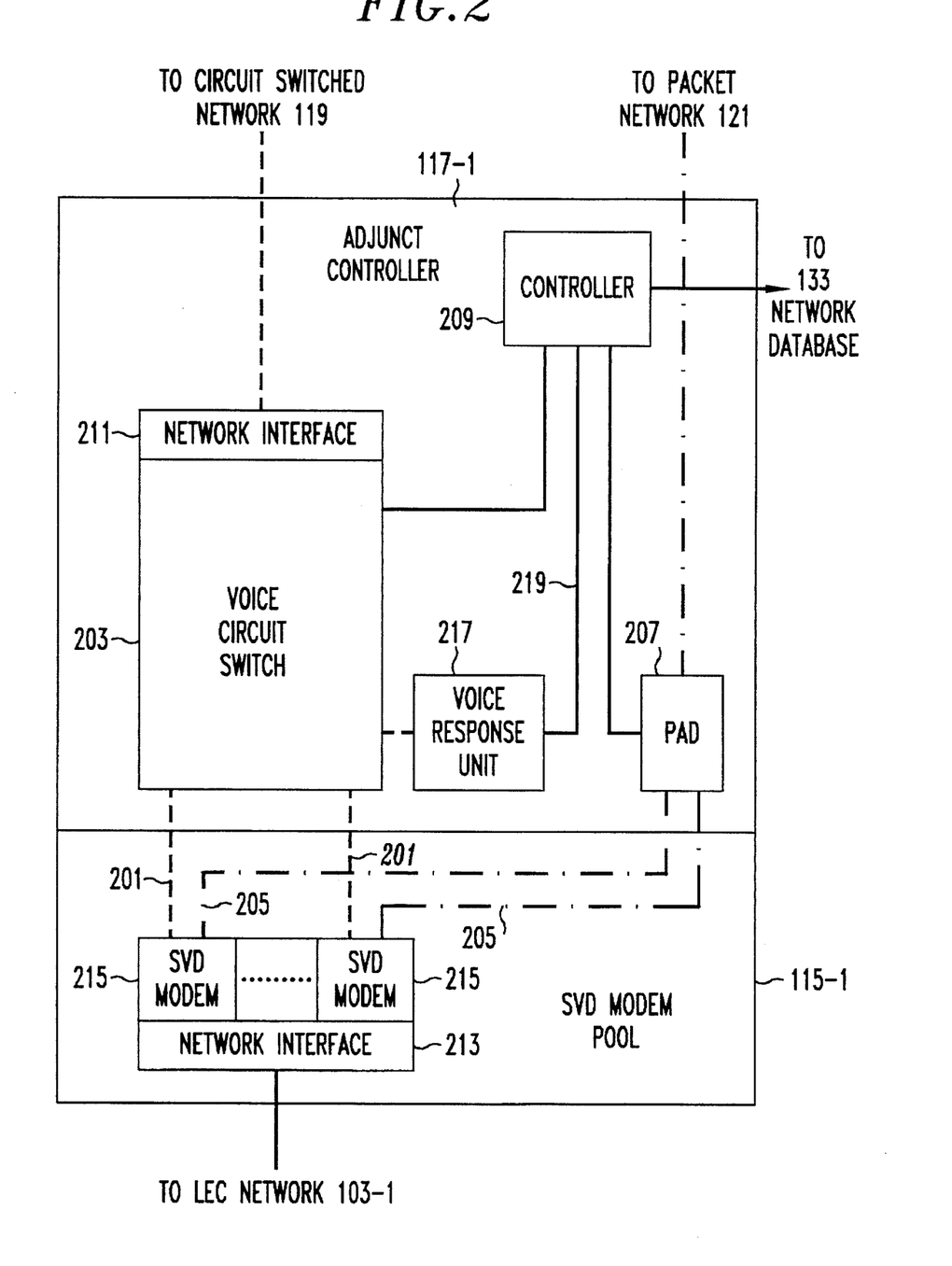
FIG. 2 shows an expanded view of an exemplary embodiment of an SVD modem pool and an adjunct controller of FIG. 1.

FIG. 2 shows an expanded view of an exemplary implementation of SVD modem pool 115-1 (FIG. 1) and adjunct controller 117-1. SVD modem pool 115-1 includes a plurality of SVD modems 215 (FIG. 2) and a common network interface 213. Network interface 213 is a channel bank that provides the multiplexing and demultiplexing of multiple POTS lines for communication with LEC network 103-1 (FIG. 1) over high-speed digital facilities. Network interface 213 (FIG. 2) provides a single POTS line to each SVD modem 215. SVD modems 215 perform the same functions as SVD modem 109 (FIG. 1).

The voice channel of each SVD modem 215 (FIG. 2) is communicated via links 201 to voice circuit switch 203. Voice circuit switch 203 is a conventional circuit switch, e.g., a PBX. Network interface 211 of voice circuit switch 203 multiplexes and demultiplexes the POTS channels switched by voice circuit switch 203 for communication with circuit switched network 119 over high-speed digital facilities. This connection also includes all the information necessary so that 1) outgoing calls may be routed through circuit switched network 119 and beyond and 2) incoming calls can be routed from SVD modem pool 115 to the called party, e.g., through a LEC network 103.

Voice response unit 217 is connected via voice channels to voice circuit switch 203. Voice response unit 217 is capable of independently processing each voice channel connected to it. Voice response unit 217 is also connected by control link 219 to controller 209. Control link 219 passes a) information obtained by voice response unit 217 from the channels connected thereto to controller 209 and b) indications of actions to be taken by voice response unit 217 from controller 209. In order to obtain information from the voice channels, voice response unit 217 contains dual tone multifrequency (DTMF) signal decoders and/or speech recognition units.

The data channel of each SVD modem 215 is communicated via links 205 to packet assembler/disassembler (PAD) 207. PAD 207 is an interface unit that receives data from an SVD modem and reformats the data as packets for transmission to packet network 121 (FIG. 1). PAD 207 (FIG. 2) also receives packets from packet network 121 and reformats the data in the packets into a form understandable by SVD modem 215. PAD 207 selects certain messages from the data stream of each channel and passes them to controller 209. Those of ordinary skill in the art will be able to readily design PAD 207.

Controller 209 is also connected to voice circuit switch 203, PAD 207, and network data base 133 (FIG. 1). Controller 209 (FIG. 2) is a general purpose computer for coordinating the operations of voice circuit switch 203, voice response unit 217, and PAD 207. It implements various functions including user login and authentication, coordination between voice and data channels, processing of user requests for various service options, and address translation to facilitate routing by circuit switched network 119 (FIG. 1) and packet network 121.

Those skilled in the art will recognize that some of the functionality of controller 209 may be distributed among voice circuit switch 203, voice response unit 217 and PAD 207.

Figure 3:
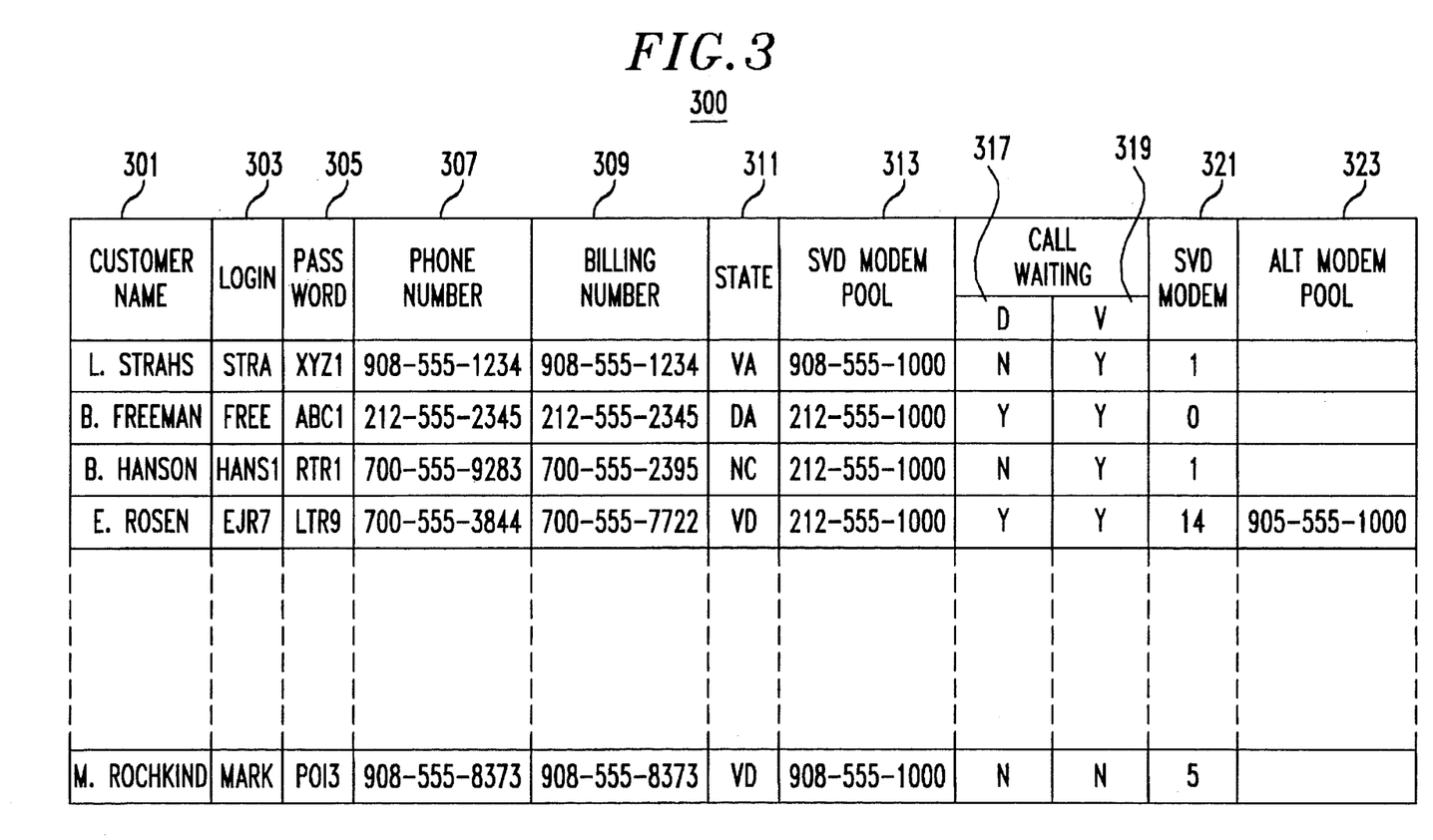
FIG. 3 shows an exemplary structure for the network data base shown in FIG. 1.

Each of adjunct controllers 117 is connected to network data base 133, which includes information about subscribers of the SVD service and their usage of the service. FIG. 3 shows exemplary data structure 300 for use in network data base 133 (FIG. 1). Shown on a row-by-row basis are values for the various fields for each customer. The fields include: a) customer name 301, b) login 303, c) password 305, d) phone number 307, e) billing number 309, f) state 311, g) SVD modem pool 313, h) data d) call waiting 317, i) voice (v) call waiting 319, and j) SVD modem 321, k) alternate (alt) modem pool 323. As is well known in the art, additional fields may be defined as applications are developed in the future.

Customer name 301 holds the name of a subscriber to SVD service. The names shown in FIG. 3 have been shortened to allow the figure to fit on one page. Login 303 contains a login code selected by the subscriber while password 305 contains a secret password that may also be selected by the subscriber or may be assigned to him by the system. Phone number 307 contains the telephone number to which calls routed to the subscriber should be routed. This number is initially populated by the calling party number when the caller logs in, using a process described below, but may be changed to another telephone number in response to the subscriber's command. Billing number 309 is the telephone number to which SVD service usage should be billed. It need not be the same as phone number 307.

State 311 reflects the current usage of the SVD service by the subscriber. The values of the states includes: 1) VA—voice only active, 2) DA—data only active, 3) NC—not connected, and 4) VD—voice and data both active simultaneously. SVD modem pool 313 is the telephone number of the modem pool through which the subscriber usually places and receives calls using SVD service.

A "Y" in data (d) call waiting 317 indicates that the subscriber has activated the call waiting feature with notification over the data channel, which is discussed below. An "N" in data (d) call waiting 317 indicates that the subscriber has not activated the call waiting feature with notification over the data channel. Similarly, a "Y" in voice (v) call waiting 319 indicates that the subscriber has activated the call waiting feature with notification over the voice channel, as discussed below, while an "N" in voice (v) call waiting 319 indicates that the subscriber has not activated the call waiting feature with notification over the voice channel. SVD modem 321 indicates the particular one of the SVD modems 215 in an SVD modem pool 115 through which a subscriber has been assigned for a particular call. Alternate (alt) modem pool 323 indicates the telephone number of a particular SVD modem pool 115 to which the subscriber connected because the SVD modem pool whose number is listed in SVD modem pool 318 was unavailable, e.g., all the modems 215 in the SVD modem pool indicated by SVD modem pool 313 were in use or technical problems placed the entire modem pool out of service.

In one implementation, each caller using the network-based SVD modems is required to log in to SVD service for the purpose of identifying himself so that 1) his particular feature options can be activated and 2) he may be billed for his use of the SVD service. In particular, a caller can be billed for a) use of an SVD modem in the SVD modem pool, b) use of a voice connection, and c) transport of data packets. The caller may also be billed for the use of direct connect hosts 123 or 131 and dial connect host 113.

Figure 4:
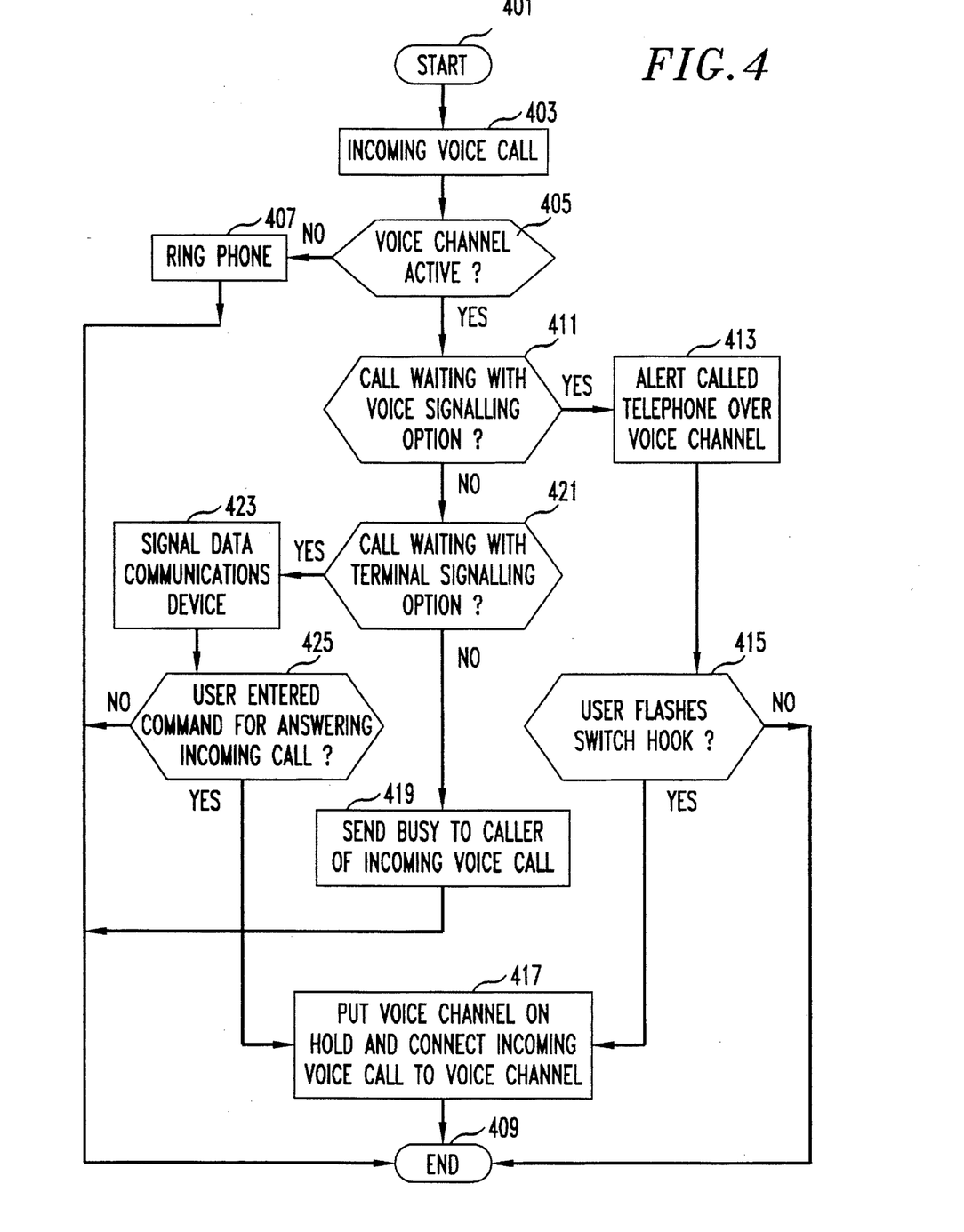
FIG. 4 shows an exemplary process for providing a call waiting feature on the voice channel even when the data channel is active, in accordance with the principles of the invention.

The foregoing platform enables the implementation of voice call waiting while the data channel is in use and data call waiting while the voice channel is in use, the latter two having the option of notification via either the voice channel or the data channel, in accordance with the principles of the invention. FIG. 4 shows an exemplary process for providing a call waiting feature on the voice channel even when the data channel is active, i.e., both channels are in use. The process begins in step 401, when at least one SVD channel is in use by a user. Next, in step 403, an incoming voice call is received at voice circuit switch 203 of the adjunct controller associated with the SVD channel in use by the user. Conditional branch point 405 tests to determine if the voice channel of the called user is active. If the test result in step 405 is NO, indicating there is no need for call waiting, control passes to step 407, in which the called user's phone is alerted. The process then ends in step 409.

If the test result in step 405 is YES, indicating the called user's voice channel is in use and that call waiting must be used if the called party is to be alerted to the existence of the incoming call, control passes to step 411. Conditional branch point tests to determine if the called user has activated the call waiting with voice signaling option, in accordance with an aspect of the invention. This is done by checking the value of voice (V) call waiting 319 (FIG. 3). If the test result in step 411 is YES, indicating that call waiting with voice signaling option is activated, i.e., the value of voice (V) call waiting 319 (FIG. 3) is "Y", control passes to step 413. In step 413 an indication that there is another incoming voice call is supplied to the called user over the voice channel only, e.g., a special call waiting tone-such as the tone supplied for conventional residential call waiting-is coupled into the voice channel on the network side of the SVD modem in the network to which the called user is connected, in accordance with the principles of the invention.. The special call waiting tone is provided by voice circuit switch 203.

Control then passes to conditional branch point 415, which tests to determine if the called user wishes to connect to the incoming call. This is typically signaled by the called user flashing, i.e., quickly depressing, his switch hook. If the test result in step 415 is YES, indicating that the called user wishes to connect to the incoming call, control passes to step 417, in which voice circuit switch 203 places the presently connected voice channel on hold and connects the incoming voice call to the called user's voice channel. The process then exits in step 409.

If the test result in step 411 is NO, indicating that the call waiting with voice signaling option is not active, i.e., an "N" is stored in voice (V) call waiting 319 (FIG. 3), control passes to conditional branch point 421, which tests to determine if the call waiting with terminal signaling option is active, in accordance with an aspect of the invention. That the call waiting with terminal signaling option is active is indicated by a "Y" in data (D) call waiting 317 (FIG. 3). If the test result in step 421 is YES, indicating that the call waiting with terminal signaling option is active, control passes to step 423, in which controller 209 provides a call waiting indication over the data channel, e.g., as a special message, which causes an indication that there is an incoming voice call to be displayed on data communications device 111, in accordance with an aspect of the invention. This may be done by having PAD 207 insert the special message into the data stream on the network side of the SVD modem in the network to which the called user is connected. Control then passes to conditional branch point 425, which tests to determine if the user has entered the command for placing the existing voice call on hold and answering the incoming voice call. If the test result in step 425 is YES, control passes to step 417, and the process continues as described above.

If the step results in step 415 or 425 are NO, indicating that the called user does not wish to answer the incoming call, control passes to step 409 and the process is exited. If the test result in step 421 is NO, indicating that the call waiting feature is not active at all for the called user, i.e., there is an "N" stored in both data (D) call waiting 317 (FIG. 3) and voice (V) call waiting 319 (FIG. 3) control passes to step 419, in which a busy indication is sent to the caller who placed the incoming call. The process is then exited in step 409.

Furthermore, in a related feature, a call carried on one of the SVD modem channels can be placed on hold and a second call over the same channel can be placed to a different destination. The signaling for establishing such a second call, as well as for switching between the first and second calls, may be performed over either of the SVD modem channels.

In an example using the voice channel, subscriber 101-1 (FIG. 1), who is talking on a first voice call through an SVD modem 215 in SVD modem pool 115-1, places that first call on hold, by flashing the switch hook on telephone 107-1. Voice circuit switch 203 of adjunct controller 117-1 a) recognizes the switch hook flash, b) places the first call on hold, and c) transmits a dial tone to telephone 107-1. Upon hearing the dial tone, the caller dials the destination address for new a voice call. Voice circuit switch 203 receives the digits and, in conjunction with controller 209, causes a connection to be established to the destination specified by the dialed digits, as described above. Subscriber 101-1 can then alternate between the two calls by flashing the switch hook on telephone 107-1.

It is noted that signaling other than a switch hook flash may be used to activate the feature and to control which call is active at any particular time. Also, the user may signal the actions to be taken by transmitting particular messages over the data channel. Such messages are received by PAD 207 and passed to controller 209, which then causes voice circuit switch 203 to take appropriate action.

In an example using the data channel, subscriber 101-1 (FIG. 1), who is communicating on a first data call through an SVD modem 215 in SVD modem pool 115-1, requests a second data call by supplying a predefined message which includes a data destination address. PAD 207 of adjunct controller 117-1 a) recognizes the message, b) places the first call on hold, and c) causes a data connection to be established to the supplied destination address, as described above. Data will not be lost for data calls placed on hold provided that sufficient data storage capability exists, e.g., in packet network 121, to hold any packets that arrive while such data calls are on hold. Subscriber 101-1 can then alternate between the two calls by supplying an appropriate message from terminal 111-1.

It is noted that the user may signal the actions to be taken on the data channel by employing signaling, e.g., switch hook flashes and dual tone multifrequency signals, over the voice channel. Such signals are received by voice circuit switch 203 and passed, via voice response unit 217, to controller 209. Controller 209 then causes PAD 207 to take appropriate action.

It is also noted that a public switched telephone network includes any communications network generally available for public use including, without limitation, the networks of LECs, IXCs, mobile telephone service providers, and cable companies. It is also noted that packet switched networks include any type of network providing packet service, including frame relay and asynchronous transfer mode (ATM).

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. A method for use in a public switched network having a simultaneous voice/data (SVD) modem, comprising the steps of:

receiving a call destined for a subscriber having an SVD modem, the channel of said subscriber SVD modem over which said received call must be routed being already in use; and supplying an alert to said subscriber without disrupting any communication that is in-progress over the data channel of said subscriber SVD modem.

2. The invention as defined in claim 1 wherein said alert is supplied in said supplying step over the same channel on which said call is received.

3. The invention as defined in claim 1 wherein said alert is supplied in said supplying step over a channel other than that on which said call is received.

4. The invention as defined in claim 1 further comprising the steps of:

detecting a signal from said subscriber indicating that said subscriber will answer said received call;

placing the already in use channel on hold; and connecting said already in use channel to said received call.

5. A method for use in a public switched network having a simultaneous voice/data (SVD) modem that can simultaneously carry a voice and data channel in a single POTS channel, comprising the steps of:

receiving a call destined for a subscriber having an SVD modem, the channel of said subscriber SVD modem over which said received call must be routed being already in use;

retrieving prestored information indicating the type of alerting to be supplied in response to an incoming call if said incoming call is one that must be carried to said subscriber over a channel that is already in use; and supplying said indicated type of alerting to said subscriber.

6. The invention as defined in claim 5 wherein said alerting is supplied in said supplying step over the same channel on which said call is received.

7. The invention as defined in claim 5 wherein said alerting is supplied in said supplying step over a channel other than that on which said call is received.

8. The invention as defined in claim 5 further comprising the steps of:

detecting a signal from said subscriber indicating that said subscriber will answer said received call;

placing the already in use channel on hold; and connecting said already in use channel to said received call.

9. A method for use in a public switched network having a simultaneous voice/data (SVD) modem, comprising the steps of:

receiving a call destined for a subscriber having an SVD modem whose telephone line is already in use on a call using a first of the two channels provided by said subscriber's SVD modem;

determining that said received call can only be carried over said first channel; and alerting said subscriber over the second of the two channels provided by said subscriber's SVD modem that said received call is waiting to be answered.

10. A method for use in a public switched network having a simultaneous voice/data (SVD) modem, comprising the steps of:

receiving a call destined for a subscriber having an SVD modem whose telephone line is already in use on a call using a first of the two channels provided by said subscriber's SVD modem; and alerting said subscriber over the second of the two channels provided by said subscriber's SVD modem that said received call on said first channel is waiting to be answered if said second channel can carry such an alert.

11. A method for communicating the existence of an incoming call to a called party, the method comprising the step of:

supplying an alerting indication to said called party, said alerting being supplied over only one of the channels supplied as an output by a simultaneous voice/data (SVD) modem and in joint response to (i) an SVD modem being provisioned at the destination of said call and (ii) the existence of another call through said destination SVD modem at the time said call is incoming, said another call being carried on the same channel as that required to carry said call.

12. A method for use in a public switched network having a simultaneous voice/data (SVD) modem that can simultaneously carry a voice and data channel in a single POTS channel, said SVD modem being used by a subscriber having an SVD modem whose telephone line is already in use on a first call using a first of the two SVD modem channels to a first destination, the method comprising the steps of:

receiving a signal from said subscriber indicating that said subscriber desires to make a second call over said first channel;

placing said first call on said first channel on hold; and connecting said second call over said first channel to a second destination.

13. The invention as defined in claim 12 wherein said signal is received over said first channel.

14. The invention as defined in claim 12 wherein said signal is received over the second of the two SVD modem channels.

15. The invention as defined in claim 12 further comprising the steps of:

receiving another signal from said subscriber indicating that said subscriber desires to return to said first call; and reconnecting said subscriber to said first call over said first channel.

16. The invention as defined in claim 15 wherein said other signal from said subscriber indicating that said subscriber desires to return to said first call is received over said first channel.

17. The invention as defined in claim 15 wherein said other signal from said subscriber indicating that said subscriber desires to return to said first call is received over the second of the two SVD modem channels.

18. The invention as defined in claim 15 further including the step of placing said second call on hold.

* * * * *